Oct. 25, 1960 W. STELZER 2,957,311
MOTOR MECHANISM
Filed Dec. 28, 1956
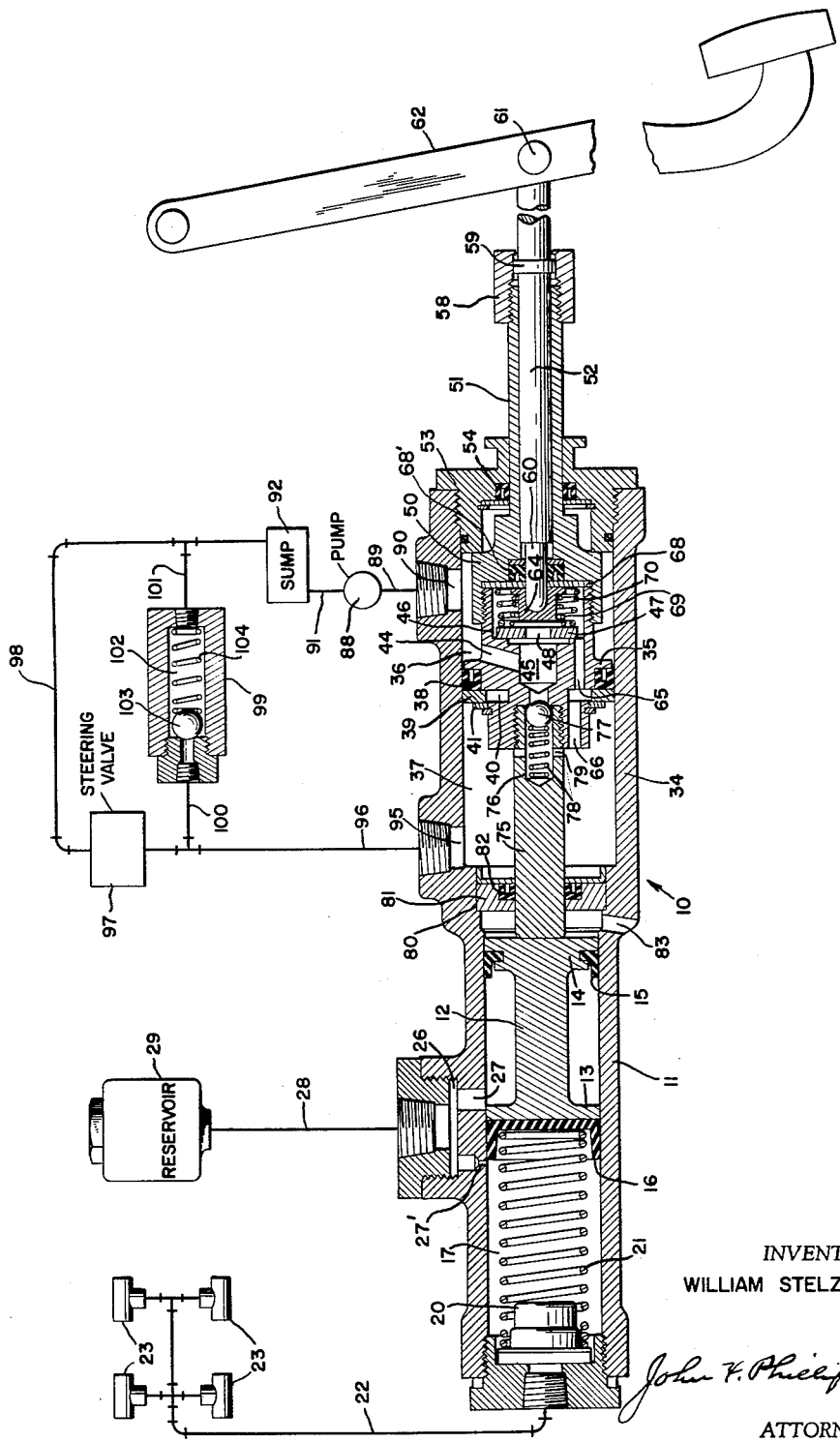
INVENTOR
WILLIAM STELZER
John F. Phillips
ATTORNEY United States Patent Office 2,957,311
Patented Oct. 25, 1960

2,957,311

MOTOR MECHANISM

William Stelzer, Bloomfield Hills, Mich., assignor to Kelsey-Hayes Company, a corporation of Delaware Filed Dec. 28, 1956, Ser. No. 631,106

10 Claims. (Cl. 60—52)

This invention relates to a motor mechanism, and more particularly to such a mechanism of the type employing a hydraulically operated booster motor particularly for operating vehicle braking systems.

An important object of the invention is to provide a novel mechanism of the character referred to having a hydraulic booster and a master cylinder arranged as a unit in axial alinement, thus greatly simplifying the construction.

A further object is to provide such a mechanism wherein the hydraulic motor is adapted to be operated by fluid displaced by a motor employed for operating a power steering mechanism, and wherein a follow-up action of the motor piston is secured through the operation of a throttling valve, controlled directly by the brake pedal.

A further object is to provide an apparatus of the character referred to wherein the piston of the hydraulic motor has a portion directly engageable with the plunger of the master cylinder to transmit direct forces from the pedal to the master cylinder piston, and wherein the throttling valve which controls energization of the hydraulic motor, and the parts associated therewith, are so arranged in normal positions as to provide for the free circulation of hydraulic fluid through the motor without effecting any actuation thereof.

A further object is to provide an apparatus of this character wherein a progressively increasing hydraulic reaction against the brake pedal is provided, whereby a normally "soft" initial pedal is provided as is desirable, and wherein hydraulic reactions against the pedal progressively increase throughout the range of brake application.

A further object is to provide novel motor control means whereby three stages of pedal operation are provided, namely, a soft initial stage operating solely against light spring pressure; a second or intermediate stage in which limited and progressively increasing hydraulic reactions are transmitted to the brake pedal as the motor is energized, and a third stage in which progressively heavier hydraulic reactions are transmitted to the brake pedal.

Other objects and advantages of the invention will become apparent during the course of the following description.

In the drawing I have shown one embodiment of the invention. In this showing:

The figure is an axial sectional view through the motor and master cylinder, parts being broken away and parts being shown in section, the other elements of the brake system being diagrammatically represented.

Referring to the drawing, the numeral 10 designates a preferably die-cast body one end 11 of which constitutes a master cylinder in which is arranged a plunger 12 having heads 13 and 14 arranged at opposite ends thereof, the head 14 being sealed in the master cylinder as at 15. The head 13 is provided with a lipped cup 16 and is movable to the left of the normal position shown in the drawing to generate pressure in a master cylinder chamber 17.

The master cylinder is provided with a conventional residual pressure valve 20 and a return spring 21 is interposed between this valve and the lipped cup 16 to bias the plunger 12 to the normal position shown. Fluid from the chamber 17 passes through the residual pressure valve 20 in the usual manner and flows through suitable hydraulic lines 22 to the vehicle wheel cylinders 23.

The master cylinder is provided thereabove with a chamber 26 communicating with the space behind the head 13 through the usual port 27. Just ahead of and immediately adjacent the lip of the cup 16 a small replenishing port 27' communicates between the chamber 26 and the chamber 17. The chamber 26 is supplied with hydraulic fluid through a line 28 connected to any suitable type of reservoir 29.

The right-hand end of the body 10 constitutes a hydraulic motor, comprising a cylinder 34 the internal diameter of which is appreciably larger than the internal diameter of the master cylinder 11. The cylinder 34 is provided therein with a piston or plunger 35 dividing the cylinder 34 to form inlet and outlet chambers 36 and 37 respectively.

The piston 35 is sealed in the cylinder 34 as at 38, and to the left of the seal 38 is arranged a floating bearing 39 arranged in a slot 40 surrounding the piston 35 and maintained in position longitudinally of the piston 35 by a ring 41.

The chamber 36 communicates through a passage 44 with a bore 45 within the plunger 35. The piston 35 rearwardly of the bore 45 has an enlarged bore 46 in which is arranged a disk valve 47 normally engaging the shoulder between the bores 45 and 46 and provided with an axial opening 48.

On the rear end of the plunger 35 is threaded a cap 50 carrying an integral rearwardly extending tubular piston 51 in which is slidable a rod 52. The piston 51 slides in a bearing 53 threaded in the rear end of the motor cylinder 34, and the piston and bearing are sealed with respect to each other as at 54. It will be noted that the rear end of the forward portion of the cap 50 seats against the inner end of the bearing 53 to limit rearward movement of the plunger 35.

A cap 58 is threaded on the rear end of the piston 51 and forms a bearing in which is slidable a collar 59 carried by the rod 52 the rear end of which is connected as at 61 to a conventional brake pedal 62.

The inner or left-hand end of the rod 52 is reduced as at 60 and is received in the recessed rear end of a head or valve 64 normally spaced from the valve 47 to provide for normal communication between the bores 45 and 46. The latter bore communicates through a passage 65 with a passage 66, formed in the piston 35 forwardly of the groove 40. The forward end of the passage 66 communicates with the motor chamber 37. It will become apparent that with the parts in the normal positions shown, fluid can flow freely between the chambers 36 and 37.

Rearward movement of the head 64 is limited by a washer 68 serving to maintain in position a seal 68' surrounding the stem 60. The head 64 is biased for rearward movement by a relatively light spring 69. This spring is surrounded by a second heavier spring 70 which biases the valve 47 against its seat as shown in the drawing.

An axial rod 75 has its rear end threaded in the plunger 35 and is provided in such rear end with a bore 76 adapted under conditions to be described to communicate with the bore 45. This communication is normally cut off by a ball valve 77 biased to closed position by a spring 78. The bore 76 communicates with the chamber 37 through ports 79.

Between the chambers 17 and 37, the body 10 is provided with a bore 80 in which is arranged a bearing 81 through which the rod 75 projects into engagement with the plunger head 14. The bearing 81 is sealed as at 82 relative to the rod 75, and the space between the head 14 and bearing 81 is vented to the atmosphere as at 83.

A hydraulic pump associated with the power steering mechanism (not shown) of the vehicle is diagrammatically illustrated and indicated by the numeral 88. The outlet of this pump communicates through a hydraulic line 89 with a port 90 leading into the chamber 36. Fluid is supplied to the pump 88 through a line 91 leading from the usual sump 92.

The chamber 37 is provided with an outlet port 95 connected to one end of a hydraulic line 96 leading to the conventional steering valve 97, and from this valve a return line 98 leads to the sump 92. A relief valve indicated as a whole by the numeral 99 is interposed between and connected to the pipes 96 and 98 respectively by lines 100 and 101. The relief valve is provided with an internal chamber 102 in which is arranged a ball valve 103 normally seated by a spring 104 to cut off communication between the lines 100 and 101, it being understood that the valve 103 will open when a predetermined pressure is present in the line 96.

Operation

The parts normally occupy the positions shown in the drawing. Fluid flows from the pump 88 into the chamber 36, through passage 44 into bore 45, thence through valve opening 48 into the bore 46, the fluid then flowing through passages 65 and 66 into the chamber 37. From this chamber fluid flows through line 96 to the steering valve, the fluid being by-passed in the conventional manner through the relief valve 99 to the sump 92. The rod 75 and tubular piston 51 are of the same diameter, hence the effective end faces of the piston 35 subject to pressures in the chambers 36 and 37 are equal. Thus there will be no differential pressures tending to move the piston 35, and this piston will be maintained in its normal position by the spring 21 in the master cylinder chamber 17.

To operate the mechanism, the operator will depress the brake pedal 62. The collar 59 will slide in the bearing 58 and the rod 52 will move to the left so that its left-hand end approaches the valve port 48 to restrict the flow of fluid between the chambers 36 and 37. This initial movement of the rod 52 takes place solely against the compression of the light spring 69 thus providing a "soft" initial pedal.

Movement of the left end of the rod 52 into proximity to or into engagement with the disk valve 47 restricts the flow of fluid in the manner described from chamber 36 to the chamber 37, thus causing a building up of pressure in the chamber 36 to move the piston 35 toward the left. This movement will be transmitted through the rod 75 to the master cylinder plunger 12 to displace fluid from the chamber 17 into the wheel cylinders.

It will be apparent that the head 64 is larger in diameter than the valve port 48 and accordingly is adapted to close such port. At the time of the initial building up of differential pressures in the manner described to move the piston 35 toward the left, pressures in the chamber 36 will act against the left-hand end of the head 64, thus providing hydraulic reaction against the brake pedal in the second stage of brake operation. It will be obvious that the left end of the head 64 in co-operation with the valve disk 47 acts as a throttling means controlling the flow of fluid between the chambers 36 and 37 and consequently controlling the pressure in the chamber 36 during the stage of operation referred to, the throttling valve means acting in the nature of a follow-up valve device. So long as the rod 52 follows movement to the left of the valve 47 by restricting flow of fluid through the port 48, higher pressures will exist in the chamber 36 than in the chamber 37 and movement of the piston 35 will continue. If movement of the rod 52 is arrested, a very slight additional movement of the piston 35 will "crack" the port 48 to communication with the bore 46, thus preventing an additional building up of pressure in the chamber 36 and arresting movement of the piston 35.

Assuming that brake operation is continued, additional pressure on the brake pedal will cause the left end of the head 64 to remain in engagement with the disk valve 47 to maintain the valve port 48 closed. Thus pressure in the chamber 36 will be built up through a third stage of brake operation, and when the pressure in the chamber 36 reaches a predetermined point, it will react against the valve disk 47 to crack this valve from its seat. Reaction will now be applied to the rod 52 and to the brake pedal proportionate to the total area of the valve disk 47. Thus in the third stage of valve operation a proportionately heavier hydraulic reaction is applied to the brake pedal.

Assuming that the hydraulic motor is energized to the maximum extent permitted by means described below, and a further brake application is desired, a heavier pedal pressure, acting through the rod 52, disk valve 47 and plunger 35, will assist the pressure in the chamber 36 in generating higher pressures in the master cylinder chamber 17.

It is well known that operation of the steering valve of a hydraulic power steering mechanism, such as the valve 97, causes the generation of back pressure between the steering valve and the pump. This is true, of course, in the present case, and accordingly, upon operation of the steering valve, pressure will develop in the lines 89 and 96 and also in the motor chambers 36 and 37. This does not in any way affect the booster motor of the present invention when the latter is not operating, since pressures will still be balanced in the motor chambers 36 and 37 and the same piston areas will be exposed to these chambers for the reason that the sleeve 51 and rod 75 are of the same cross sectional area.

A different situation exists, however, if the brake is being operated and the steering wheel is then turned, but the characteristics of the present construction are such that the actual functioning of the brake applying mechanism will not be affected. Assuming that the brake has been operated and the steering wheel is then turned, back pressure will occur in the motor chamber 37 and will tend more tightly to seat the valve 64, or the disk 47, if the second stage of brake operation is taking place. In such case the back pressure will tend to assist the operator in throttling the flow of fluid from the chamber 36 to the chamber 37, thus causing an immediate increase in pressure in the chamber 36 due to the action of the pump 88. This increase in pressure in the chamber 36 takes place until a point is reached at which the motor throttling valve device will function strictly in accordance with force being applied to the brake pedal by the operator. It is an inherent characteristic of the booster motor of the present case, therefore, in an open system of the kind described, for the valve mechanism immediately to adjust itself to any variation in hydraulic fluid conditions in the system due to operation of the steering valve. In other words, whether the brake pedal is operated while the steering mechanism is inoperative, or the steering mechanism becomes operative after initiation of a brake application, the braking operation is still perfectly under the control of the operator both as to the function of applying the brakes and as to the application of reaction to the brake pedal.

It is necessary, of course, to maintain the flow of hydraulic fluid for use by the steering valve and, in view of the capacity of the pump 88, it is further necessary to limit the generation of pressures in the chamber 36.

For this purpose, the ball valve 77 is provided. In practice, the spring 78 is so loaded as to maintain the valve 77 closed up to pressures of preferably about 400 p.s.i. in the chamber 36. This pressure represents the maximum energizing pressure which can be built up in the chamber 36, and beyond such pressure the valve 77 will open for the flow of fluid from bore 45 into the bore 76, thence through ports 79 into the chamber 37 and through hydraulic line 96 to the steering valve 97 and relief valve 99. Thus adequate pressure will be provided for operating the steering valve while the brakes are applied, and excessive pressure in the chamber 36 is prevented.

It will be apparent that in the event of a failure of hydraulic pressure for operating the motor, the brakes are still subject to manual operation. Depression of the brake pedal will move the inner end of the rod 52 into engagement with the disk 47, thus manually moving the plunger 35 and transmitting movement directly through the axial extension 75 to the master cylinder plunger 12. Thus fluid will be displaced from the master cylinder chamber 17 directly by pedal pressure.

It will be apparent that the hydraulic motor 10 is arranged in the hydraulic steering circuit between the pump 88 and the steering valve 97. The flow of hydraulic fluid to the steering valve thus is through the hydraulic motor. If, while applying the brakes, the steering wheel should be turned to operate the steering valve 97, a back pressure will occur through line 96 in the chamber 37, providing some tendency to buck against the piston 35, and thus transmit an undesirable increased reaction against the rod 52 and hence against the pedal 62. The device, however, is so constructed as to minimize such increased reaction effect. Upon the occurrence of the back pressure in the chamber 37, such pressure will be transmitted through passages 66 and 65 to the bore 46 to act against the portion of the right-hand side of the disk 47 outwardly of the head 64, thus subjecting the disk 47 to a pressure tending to maintain it in closed position, this force being in addition to the force exerted by the operator. Moreover, under the conditions described the valve or head 64 will be in engagement with the disk 47, and the right-hand end of the valve 64 will be subjected to the same increased pressure tending to assist the operator in maintaining the head 64 against the disk 47. The reduction in the size of the stem 60 increases the area of the head 64 subjected to such pressure. The back pressure referred to thus will be utilized to assist the operator in transmitting force to both of the elements 47 and 64, and the undesirable increase in reaction against the pedal 62 will be minimized.

The present mechanism provides a coaxial arrangement of all of the parts of the motor, the valve mechanism and its operating means and the master cylinder, thus facilitating the manufacture and assembly of the parts and providing for an economical manufacture of the apparatus. The use of the floating bearing 39 is desirable in eliminating problems of concentricity involving the hydraulic motor piston. It will be noted that the piston 35 has clearance with the wall of the cylinder 34, thus permitting the plunger to be freely movable in the bearings 53 and 81 without any binding action of the piston 35 in the cylinder 34. The seal 38 effectively seals the chambers 36 and 37 from each other and the floating bearing 39, while fixed against movement longitudinally of the piston 35, may alter its position radially of the piston to accommodate for any inaccuracies in the concentricity of the motor cylinder and the bearings 53 and 81.

Attention is invited to the fact that when the parts are in the normal operating positions shown, the circulation of hydraulic fluid through the motor maintains pressure in both chambers 36 and 37. The axial extension 75 and sleeve 51 preferably are of equal diameter so that the piston has net equal areas subject to pressures in such chambers. In the off positions of the parts, therefore, there are no differential pressures present in the chambers 36 and 37, the pressures therein always being approximately equal, and accordingly there is no tendency for the motor piston 35 to creep toward the left. If desired, the axial extension 75 may be made of slightly smaller diameter than the sleeve 51, thus providing the piston 35 with a net area exposed to the chamber 37 slightly greater than its area exposed to the chamber 36. In this case when pressures are balanced in the chambers 36 and 37 there will be a net effective pressure tending to maintain the piston 35 in its normal off position. In any event, therefore, the diameter of the sleeve 51 should be at least as great as the diameter of the axial extension 75.

The throttling valve per se for controlling the follow-up action of the hydraulic motor piston is disclosed and claimed in my copending application Serial No. 625,070, filed November 29, 1956, now Patent No. 2,913,877, granted November 24, 1959.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a casing and a piston therein dividing said casing to form an inlet chamber and an outlet chamber, means carried by said piston comprising a normally open valve establishing communication between said chambers, constantly operating means for pumping fluid into said inlet chamber and discharging it from said outlet chamber, a disk forming a seat for said valve and having a normal position in which it has an area substantially larger than the area of said valve subject to pressure in said inlet chamber, and a spring engaging said disk to bias it to said normal position, said disk having an axial opening toward which said valve is movable against the flow of fluid from said inlet chamber to said outlet chamber to throttle communication between said chambers and to build up pressure in said inlet chamber to effect movement of said piston, said valve when in closed position having an area subject to pressure in said inlet chamber, acting through said axial opening, to hydraulically react against said valve, said spring being loaded to be overcome at a relatively high pressure against said disk whereby said area of said disk increases the hydraulic reaction against said valve, and work-performing, motion-transmitting means connected to said piston.

2. A motor mechanism comprising a chamber having a piston therein and dividing said casing to form an inlet chamber and an outlet chamber, bypass means normally connecting said chambers through said piston and comprising a valve seat and a manually operable valve normally spaced from said seat, means constantly delivering hydraulic fluid to said inlet chamber and discharging fluid from said outlet chamber, said valve having one end engageable with said seat to throttle the flow of fluid through said valve seat from said inlet chamber to said outlet chamber whereby pressure in said inlet chamber increases to effect movement of said piston, an axial work-performing stem connected to said piston, a manually movable operating rod connected to said valve, said end of said valve being subject to pressures in said inlet chamber to hydraulically react against said rod, said valve seat comprising a disk having an opening therethrough, said bypass means having a second valve seat of substantially greater area than said opening and against which said disk normally seats, and a spring normally holding said disk on said second seat against pressure in said inlet chamber whereby, upon a building up of pressure in said inlet chamber above a predetermined point, the area of said disk within said second seat becomes effective for transmitting hydraulic reactions to said rod.

3. A motor mechanism comprising a chamber having a piston therein and dividing said casing to form an inlet chamber and an outlet chamber, bypass means normally connecting said chambers through said piston and comprising a valve seat and a manually operable valve normally spaced from said seat, means constantly delivering hydraulic fluid to said inlet chamber and discharging fluid from said outlet chamber, said valve having one end engageable with said seat to throttle the flow of fluid through said valve seat from said inlet chamber to said outlet chamber whereby pressure in said inlet chamber increases to effect movement of said piston, an axial work-performing stem connected to said piston, a manually movable operating rod connected to said valve, said end of said valve being subject to pressures in said inlet chamber to hydraulically react against said rod, said valve seat comprising a disk having an opening therethrough, said bypass means having a second valve seat of substantially greater area than said opening and against which said disk normally seats, a spring normally holding said disk on said second seat against pressure in said inlet chamber whereby, upon a building up of pressure in said inlet chamber above a predetermined point, the area of said disk within said second seat becomes effective for transmitting hydraulic reactions to said rod, and means connected between said chambers for bypassing fluid from said inlet chamber to said outlet chamber when the pressure in said inlet chamber increases to a predetermined point above the pressure at which said spring yields.

4. A motor mechanism comprising a chamber having a piston therein and dividing said casing to form an inlet chamber and an outlet chamber, bypass means normally connecting said chambers through said piston and comprising a valve seat and a manually operable valve normally spaced from said seat, means constantly delivering hydraulic fluid to said inlet chamber and discharging fluid from said outlet chamber, said valve having one end engageable with said seat to throttle the flow of fluid through said valve seat from said inlet chamber to said outlet chamber whereby pressure in said inlet chamber increases to effect movement of said piston, an axial work-performing stem connected to said piston, a manually movable operating rod connected to said valve, said end of said valve being subject to pressures in said inlet chamber to hydraulically react against said rod, said valve seat comprising a disk having an opening therethrough, said bypass means having a second valve seat of substantially greater area than said opening and against which said disk normally seats, a spring normally holding said disk on said second seat against pressure in said inlet chamber whereby, upon a building up of pressure in said inlet chamber above a predetermined point, the area of said disk within said second seat becomes effective for transmitting hydraulic reactions to said rod, said piston having a bypass passage connected between said chambers and including a check valve, and a spring stronger than said first spring normally holding said check valve closed against pressures in said inlet chamber.

5. A motor mechanism comprising a casing having a cylinder therein, a piston in said cylinder, an axially projecting stem carried by said piston, a bearing at one end of said casing through which said stem extends, a seal carried by said bearing and surrounding said stem, said piston dividing said cylinder to form an inlet chamber and an outlet chamber and having peripheral clearance with respect to said cylinder, a lipped seal carried by said piston and engaging said cylinder, a floating ring carried by said piston and slidably fitting said cylinder, said ring being mounted for radial movement relative to said piston and being fixed against axial movement relative to said piston and maintaining said last-named seal in position, normally open bypass means connecting said inlet and outlet chambers and including a normally open throttling valve, said valve being mounted for axial sliding movement coaxially of said piston and having bearing means for supporting it for such movement, and means constantly supplying hydraulic fluid to said inlet chamber and discharging such fluid from said outlet chamber, said valve being movable toward closed position to throttle flow of fluid through said bypass means from said inlet chamber to said outlet chamber whereby the supplying of hydraulic fluid to said inlet chamber will raise the pressure therein and move said piston.

6. A mechanism according to claim 5 wherein said bypass means includes a valve seat having an opening therethrough toward which said throttling valve is movable, said valve, when moved toward said seat, having an area open to pressure in said inlet chamber to be subjected to hydraulic reaction in such chamber.

7. A mechanism according to claim 5 wherein said bypass means includes a valve seat having an opening therethrough toward which said throttling valve is movable, said valve, when moved toward said seat, having an area open to pressure in said inlet chamber to be subjected to hydraulic reaction in such chamber, means connected between said inlet and outlet chambers and subject to an increase in pressure in said inlet chamber to a predetermined point for bypassing fluid from said inlet chamber to said outlet chamber, and means subject to pressure in said inlet chamber and operative below said predetermined pressure therein for proportionately increasing the hydraulic reaction against said valve.

8. A mechanism according to claim 5 wherein said bypass means includes a valve seat having an opening therethrough toward which said throttling valve is movable, said valve, when moved toward said seat, having an area open to pressure in said inlet chamber to be subjected to hydraulic reaction in such chamber, means connected between said inlet and outlet chambers and subject to an increase in pressure in said inlet chamber to a predetermined point for bypassing fluid from said inlet chamber to said outlet chamber, said valve seat comprising a disk having said opening therethrough toward which said valve is movable to throttle communication through said bypass means, said disk having a seat against which it is engageable and having an area greater than the area of said valve exposed to pressure in said inlet chamber, and a spring normally holding said disk against its seat, said spring being adapted to yield at a predetermined pressure whereby pressure in said inlet chamber, acting against said disk, will be transmitted to said valve to proportionately increase the hydraulic reaction thereagainst.

9. A motor mechanism comprising a casing having a coaxially movable piston therein, a bearing at one end of said casing, a work-performing axial extension carried by said piston and projecting through said bearing, said piston dividing said casing to form an inlet chamber and an outlet chamber, a bearing in the end of said casing opposite said axial extension, a sleeve carried by said piston and projecting through said last-named bearing, bypass means connected between said chambers including a valve seat coaxial with said piston, a rod slidable through said sleeve and having a valve at one end normally spaced from said valve seat and movable toward such seat to throttle communication between said chambers, constantly operating means for supplying hydraulic fluid to said inlet chamber and exhausting fluid from said outlet chamber, the end of said valve movable toward said valve seat being exposed to pressure in said inlet chamber to provide hydraulic reaction against said rod when said valve is moved toward said seat, said seat comprising a disk of substantially greater area than said valve, a second seat carried by said piston and against which said disk seats, and a spring biasing said disk against said second seat against pressure in said inlet chamber.

10. A motor mechanism comprising a cylinder having spaced heads and a piston therein dividing said cylinder to form a pair of chambers, a bypass communicating between said chambers, means for continuously supplying hydraulic fluid to one of said chambers, means for discharging hydraulic fluid from the other of said chambers, a first valve seat in said bypass, a throttling valve arranged in said bypass and opening away from said seat toward said other chamber, biasing means normally maintaining said valve in open position, said bypass being provided with a first chamber and a second chamber, the former of which communicates with said one motor chamber and the other of which communicates with said other motor chamber, a second valve seat between said first and second chambers opening toward said second chamber, sair first valve seat forming a valve engageable with said second seat, spring means biasing said first valve seat toward said second valve seat, and means connected to said valve to transmit force thereto move it toward said valve seat to throttle the flow of fluid therethrough and thus build up pressure in said one chamber, said piston having stems of equal diameter slidable in said heads whereby said piston has equal areas exposed to fluid in said chambers.

References Cited in the file of this patent

UNITED STATES PATENTS

| | | | |
|---|---|---|---|
| 1,890,010 | Vickers | Dec. 6, | 1932 |
| 1,921,590 | Staude | Aug. 8, | 1933 |
| 1,960,996 | Guernsey | May 29, | 1934 |
| 2,130,799 | Hofstetter | Sept. 20, | 1938 |
| 2,282,333 | Masteller | May 12, | 1942 |
| 2,318,756 | Chouings | May 11, | 1943 |
| 2,326,116 | Baldwin | Aug. 10, | 1943 |
| 2,334,383 | Carr et al. | Nov. 16, | 1943 |
| 2,343,698 | Parnell | Mar. 7, | 1944 |
| 2,642,165 | Banker | June 16, | 1953 |
| 2,661,597 | Edge | Dec. 8, | 1953 |
| 2,664,707 | Edge | Jan. 5, | 1954 |
| 2,680,350 | Sprague et al. | June 8, | 1954 |
| 2,714,899 | Kane | Aug. 9, | 1955 |
| 2,746,255 | Fitch et al. | May 22, | 1956 |
| 2,844,941 | Ayers | July 29, | 1958 |